I. A. WICKS.
AUTOMOBILE LOCK.
APPLICATION FILED JUNE 30, 1920.
1,370,937.
Patented Mar. 8, 1921.
2 SHEETS—SHEET 1.
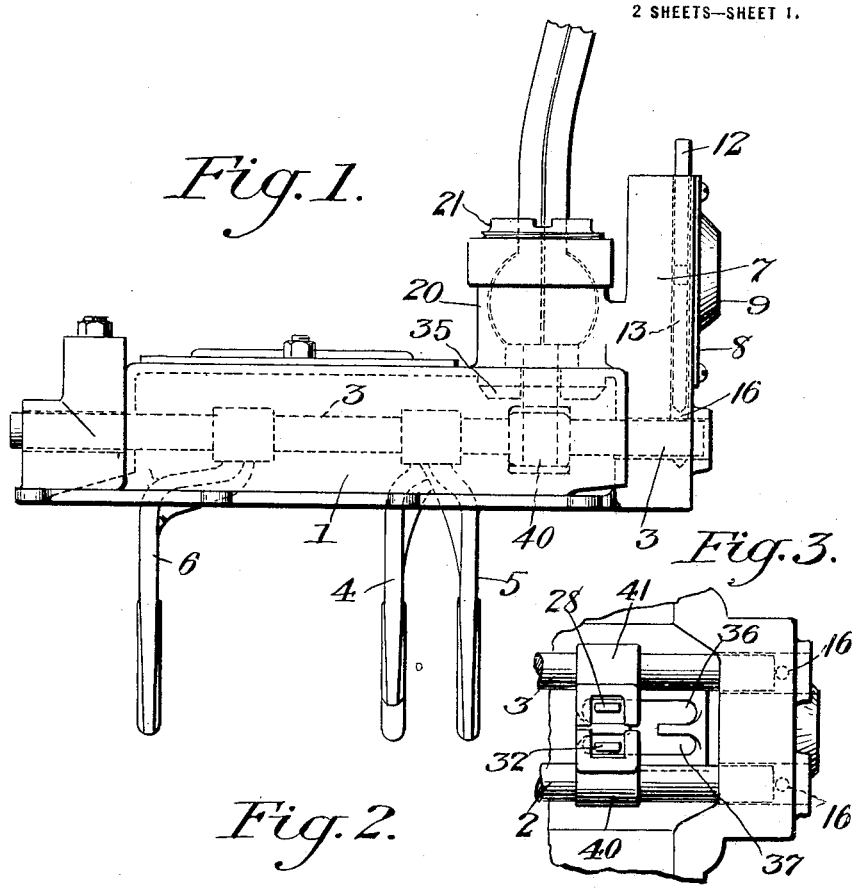
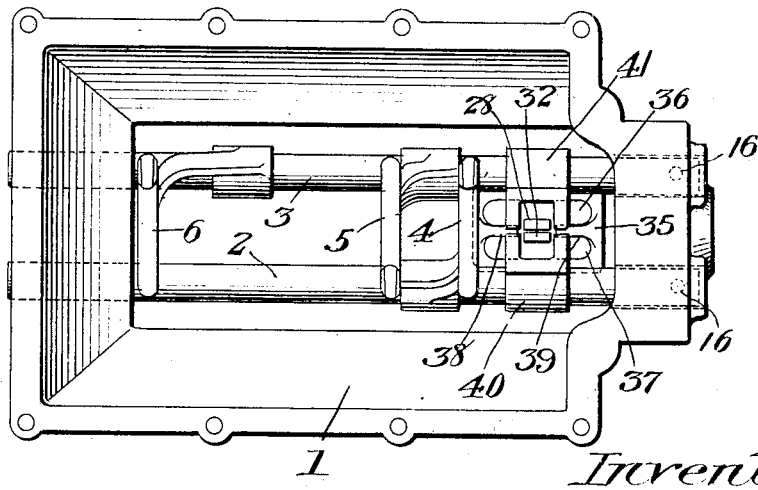
Inventor:
Ira A. Wicks

I. A. WICKS.
AUTOMOBILE LOCK.
APPLICATION FILED JUNE 30, 1920.

1,370,937.

Patented Mar. 8, 1921.
2 SHEETS—SHEET 2.

Inventor
Ira A. Wicks
by Chas. J. Hull

UNITED STATES PATENT OFFICE.

IRA A. WICKS, OF MEMPHIS, TENNESSEE.

AUTOMOBILE-LOCK.

1,370,937. Specification of Letters Patent. Patented Mar. 8, 1921.

Application filed June 30, 1920. Serial No. 392,914.

*To all whom it may concern:*

Be it known that I, IRA A. WICKS, a citizen of the United States, residing at and whose post-office address is 1106 Carr avenue, Memphis, Shelby county, Tennessee, have invented certain new and useful Improvements in Automobile-Locks; and I do hereby declare the following to be a full, clear, and exact description of the invention, such as will enable others skilled in the art to which it appertains to make and use the same.

The invention relates to locks for automobiles, and has for its object to provide means for positively locking two sets of transmission gears in driving relation so that the machine cannot be moved, either by intention or accident. To this end, the invention comprises means for shifting the elements of the transmission gear set into the desired driving relation, said means preferably involving a longitudinally divided gear shift lever, the elements of which are adapted to be separated scissors-wise, when the locking operation is to be effected, so that one element of the lever will shift one pinion into mesh with the corresponding transmission gear, and the other element of the lever will shift one of the other selected driving pinions into mesh with its corresponding gear, and means for locking said driving pinions in the relation specified, all as will be more particularly set forth in the description of the exemplary form of the invention illustrated in the accompanying drawings, in which:—

Figure 1 is a side elevation of the device with the gear shift lever broken away;

Fig. 2 is a bottom plan view;

Fig. 3 is a fragmentary bottom plan view showing the device in locked relation;

Figure 4:
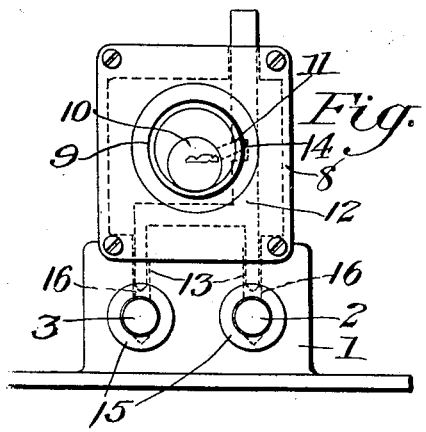
Fig. 4 is a front elevation showing the mechanism in unlocked relation.

Referring to the drawings, 1 indicates a hollow casting adapted to be secured to the automobile frame by bolts passed through the marginal flange of said casting. Mounted in longitudinally alining bearings in the casting are two selector rods, 2 and 3, the former of which carries a lever or member 4 which effects the shifting of the high and intermediate speed gears of the transmission set for forward driving, and the latter shaft 3 carries two levers 5 and 6, the former of which controls the low speed shift and the latter, the reverse speed shift. The selector rods 2 and 3, and their associated levers 4, 5 and 6, in the relation specified, are similar to those employed in automobiles involving three speeds forward, to-wit, high, intermediate and low, and a single speed in reverse, and according to standard practice, in order to effect the shifting of the gears of the transmission set to drive the vehicle forward at any one of the three speeds or to reverse the movement of the machine, one or the other of the selector rods is moved longitudinally in its bearings by means of the usual type of gear shift lever, as will be understood by those skilled in the art.

Figure 5:
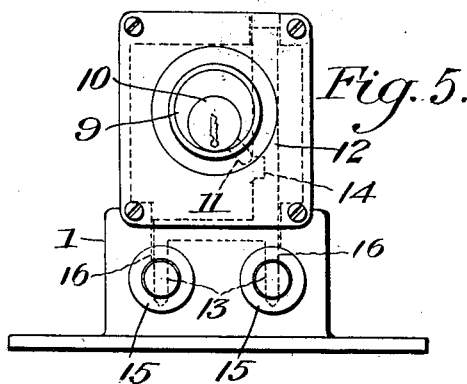
Fig. 5 is a similar view showing the device in locked relation.
Figure 6:
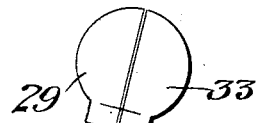
Figs. 6, 7 and 8 are detailed views of the gear shift lever.
Figure 8:
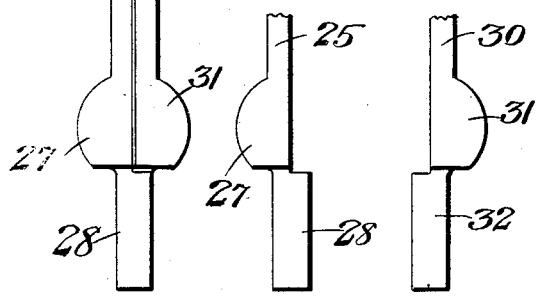
Figure 7:
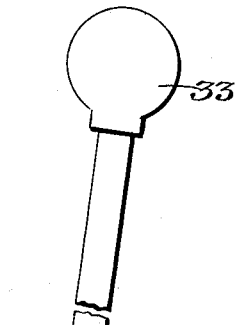

Preferably formed as an integral part of the casting 1, and extending vertically from the front portion thereof is a lock carrying member 7, provided with an escutcheon plate 8, which carries a lock 9, having a revolving barrel 10, which receives the key and which carries a radial finger 11. Mounted for vertical movement in the member 7, behind the escutcheon 8, is a locking bolt 12, provided with a notch 14, adapted to be engaged by the finger 11, so that when the barrel 10 is rotated by the key, the bolt 12 will be raised or lowered. The lower end of the bolt 12 is bifurcated into sections 13, 13 which reciprocate in vertical openings 16, 16, which extend through the base 1, at right angles to the open bearings in which the selector rods 2 and 3 move. In unlocked relation, the members 13, 13 of the bolt 12 are moved upward and out of the path of movement of the selector rods 2 and 3, as indicated in Fig. 4, but when the bolt 12 has been moved into locking position, the tines 13, 13 extend across the forward bearings for the rods 2 and 3 and lie in front of the forward ends of said rods as indicated in Fig. 5.

Formed as part of the casting 1, is a socket member 20 adapted to receive the coöperating ball member of the gear shift lever to permit the latter to have the usual universal movement common to devices of this character, said lever being held in position by a hollow cap nut 21 which is screwed onto the bearing 20.

The gear shift lever, instead of being formed as a single rod with a finger on one end to be moved to various positions to shift the movable gears of the transmission set, is divided longitudinally into two main sections 25 and 30, each of which carries one-half of the ball member which engages the socket 20, said halves being indicated by 27 and 31, respectively. The ball member at the top of the lever is also divided into sections 29 and 33, which are properly secured to each of the main sections. The lower end of lever section 25 is provided with a finger 28 and a mating finger 32 is located on the end of section 30, the two fingers normally lying in overlapping relation and being disposed at right angles to the separating surface between the lever sections 25 and 30 so that when the lever sections are moved scissors-wise in opposite directions, the fingers 28 and 32 will be spread apart, but, so long as the lever sections are held in alinement with each other, the two fingers 28 and 32 will move together as a unit.

The two finger members 28 and 32, when the lever is in position, extend downward through the usual register plate 35 provided with parallel slots 36 and 37 separated by alining lugs 38 and 39, which plate 35 is preferably formed integrally with the casting 1. The lower ends of the fingers 28 and 32 coöperate with bifurcated lugs 40 and 41, which are rigidly attached to the selector bars 2 and 3 respectively, so that when the gear shift lever is moved as a unit, the fingers on the end thereof will retain their parallel relation and engage either of the bifurcated lugs 40 or 41, or will be located midway between said lugs and also between the lugs 38 and 39, which latter position represents the neutral position of the transmission when none of the gears are connected.

The operation of the apparatus, as described, is as follows. During the normal operation of starting, driving and stopping the vehicle, the two halves of the gear shift lever are retained in alining relation. When it is designed to change speed, or reverse, the ball on the upper part of the handle is grasped by the operator, and the lever shifted in the ordinary manner, under which circumstances, the two fingers on the lower ends of the lever sections will be retained in parallelism and may be moved to the right or left, and forward or backward, or to central or neutral position, said fingers operating as a unit to effect the usual gear shifting operations. When, however, the car has been stopped, the gear shift lever moved to neutral position and it is desired to lock the car, the two members of the gear shift lever are moved scissors-wise to the right and left, respectively, which will have the effect of moving finger 28 into engagement with the forks of lug 41 on the selector rod 3, and finger 32 into corresponding engagement with the forked end of lever 40 on selector rod 2. The two ends of the gear shift lever are then moved to the rear so that finger 28 moves selector rod 3 forward to engage for example, the reverse gear with its mating element in the transmission and finger 32 moves selector rod 2 forward to engage one of the forward speed gears, preferably the intermediate speed gear, with its mate in the transmission. Under these circumstances, two sets of the transmission gears will be engaged, one for forward driving, and the other for reverse driving. This, in itself, would be sufficient to prevent the car being moved, either under its own power, or by being towed away, or being started down an incline. After the gears have been thus shifted by means of the divided gear shift lever, the selector rods 2 and 3 will be in their forward positions, and the front ends of the selector rods will have passed beyond the path of the movements of the ends 13—13 of the bolt 12 of the lock. The lock is then operated by inserting the key in the barrel and turning the same to the right, which has the effect of dropping the bolt 12, so that the end members 13 pass in front of the ends of the selector bars 2 and 3 and the latter are thereby locked against movement in either direction, and cannot be moved to shift the gears until the bolt 12 has been retracted by operating the lock. When it is desired to start the car, the key is inserted in the lock and the latter is operated to retract the bolt 12, and the two members of the gear shift levers moved back until the fingers on the lower ends thereof are opposite neutral position, when the respective halves of the lever are moved into alining relation, thereby bringing the fingers 28 and 32 on the lever sections to the position shown in Fig. 2, which represents the neutral position of the gears, when all of the driving members are disengaged. The apparatus is then in condition for normal operation and the two members of the shift lever are operated as a unit to actuate one or the other of the selector rods 2 or 3 to engage the desired members of the gear set to drive the machine forward or backward.

While the invention has been illustrated and described as applied to the standard type of gear shift mechanism, it is to be understood that it is not limited to this particular type, and, in its broader aspects, contemplates means for effecting the simultaneous engaging of two sets of gears and means for locking the particular devices which effect this result against movement, and thereby preventing the machine from being moved either accidentally or designedly.

It is to be also understood that although I have described the operation of the device, in its locked relation with respect to the forward and reverse gears, this will not be the case in every instance, owing to the different makes of gear shifts used on the various cars to which this device is applicable. All that is necessary to the efficient working and operation of the device is that two sets of gears be locked in mesh, and it makes no difference when so locked, whether said sets of gears be high, first, second or reverse speeds.

What I claim is:

1. Mechanism for locking automobiles and the like, comprising means for simultaneously shifting two sets of the transmission elements into driving relation, and means for locking the elements in such shifted relation.

2. Mechanism for locking automobiles and the like, comprising separate means for shifting two sets of the transmission elements in driving relation, a bifurcated gear shift lever the sections of which are independently movable and adapted to operate the forward and reverse gear shifting means respectively, and means for locking the elements in such shifted relation.

3. Mechanism for locking automobiles and the like, comprising a longitudinally divided gear shift lever provided with means for simultaneously operating two sets of the gear shifting means of the transmission, and means for locking each shifting means when the gears controlled thereby have been engaged.

4. Mechanism for locking automobiles and the like, comprising a base, selector rods slidably mounted therein, means for operating said rods simultaneously to couple two sets of the drive gears of the transmission, and means for locking the selector rods in the base.

5. Mechanism for locking automobiles and the like, comprising a base, selector rods slidably mounted therein, a longitudinally divided shift lever, the sections of which are independently movable to operate the selector rods simultaneously, and means for locking the selector rods in the base when said rods have moved two sets of gears of the transmission into mesh.

6. Mechanism for locking automobiles and the like, comprising a base, selector rods slidably mounted therein, means for operating said rods simultaneously to couple two sets of drive gears of the transmission, and a lock mounted on the base having a bolt coöperating with the selector rods to lock the same in the base.

7. Mechanism for locking automobiles and the like, comprising a base, selector rods slidably mounted therein, a longitudinally divided shift lever having a universal pivotal connection in said base to permit the sections to be moved laterally in opposite directions, fingers on the rod sections adapted to operatively engage the selector rods to move two sets of gears of the transmission into mesh simultaneously, and means to lock the selector rods in the base in the relation specified.

8. Mechanism for locking automobiles and the like, comprising a base, selector rods slidably mounted in alining bearings in said base, means for operating said rods simultaneously to couple two sets of drive gears of the transmission, and a lock mounted on the base provided with a bolt having fingers adapted to be moved into locking engagement with the selector rods after the latter have effected the coupling of the forward and reverse gears.

9. Mechanism for locking automobiles and the like, comprising a base, selector rods slidably mounted in longitudinal bearings in said base, a longitudinally divided shift lever having a universal pivotal connection in said base to permit the rod sections to be moved laterally in opposite directions, fingers on the ends of the rod sections adapted to operatively engage the selector rods to move two sets of gears of the transmission into mesh simultaneously, and a lock mounted on the base having a bolt provided with fingers adapted to be moved in front of the selector rods to lock the latter when the gears have been shifted in the specified relation.

In testimony whereof I affix my signature.

IRA A. WICKS.